Sept. 17, 1935. A. JOHNSON Re. 19,706

INTERCHANGEABLE SKATE AND SHOE

Original Filed Aug. 30, 1934

INVENTOR
ANTON JOHNSON
BY Zoltan Holachek
ATTORNEY

Reissued Sept. 17, 1935

Re. 19,706

UNITED STATES PATENT OFFICE 19,706

INTERCHANGEABLE SKATE AND SHOE

Anton Johnson, West Hampton, N. Y.

Original No. 1,991,855, dated February 19, 1935, Serial No. 742,051, August 30, 1934. Application for reissue April 12, 1935, Serial No. 16,058

19 Claims. (Cl. 208—168)

This invention relates to new and useful improvements in an interchangeable skate and shoe.

The invention has for an object the construction of an article as mentioned which is characterized by an arrangement wherein the skate may be removed from the shoe when desired.

Still further, the invention particularly proposes to so construct the combination of shoe and skate that the skate has an offset stud rotatively engaged in a bayonet opening in the shoe bottom for the engagement and disengagement of these parts, and in addition, the skate has a slide support and a catch for coaction with other portions of the shoe for firmly holding the skate in position on the shoe.

More particularly, it is proposed to construct the skate to be connected with a slide support adapted for engagement in a complementary opening extended in from one edge of the sole of the shoe in a manner so that the slide support assumes its operative position when the offset stud previously mentioned is moved to its operative position in the bayonet opening.

Still further the invention proposes the provision of a catch engageable with a portion of the shoe bottom to hold the skate fixed against rotative disengagement as expressed in the previous paragraph.

Still further the invention proposes the construction of a device as mentioned which is simple and durable and which can be manufactured and sold at a reasonable cost.

For further comprehension of the invention and of the objects and advantages thereof, reference will be had to the following description and accompanying drawing and to the appended claims in which the various novel features of the invention are more particularly set forth.

In the accompanying drawing forming a material part of my disclosure:—

Figure 2:
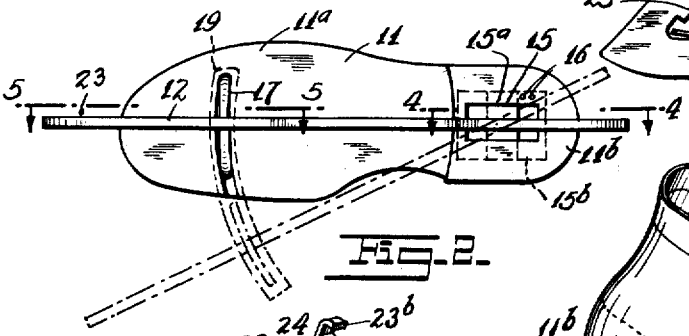
Fig. 2 is a bottom view of Fig. 1.
Figure 6:
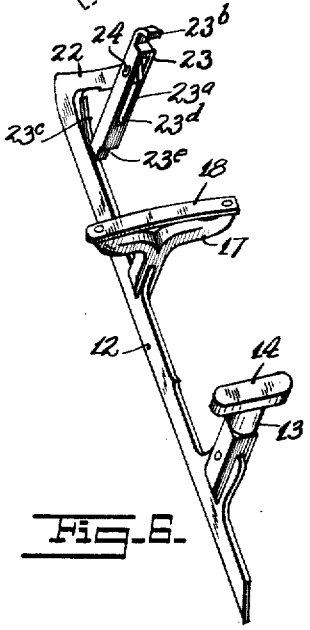
Fig. 6 is a perspective view of the skate per se.
Figure 3:
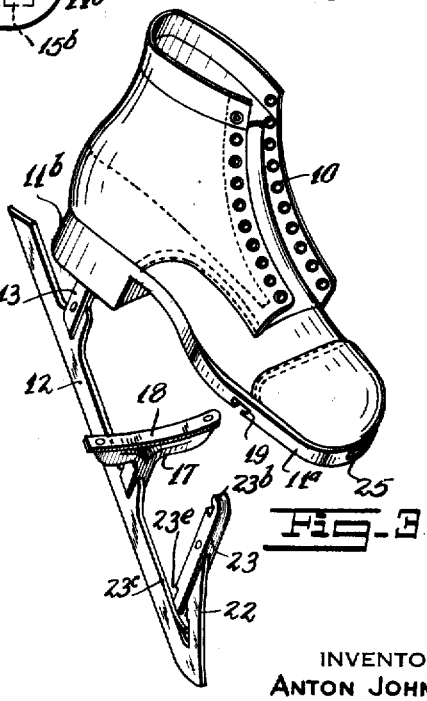
Fig. 3 is a perspective view of the shoe and skate but illustrated with the skate partially disengaged.

The interchangeable skate and shoe, according to this invention, comprises a shoe 10 having a shoe bottom 11 comprising a sole portion 11*a* and a heel portion 11*b*. The interchangeable skate associated with the shoe comprises a skate knife, blade or runner 12 having a stud 13 attached near its rear end and formed with an offset head or coupling element 14 adapted for rotative engagement in a bayonet opening or socket 15 formed in the heel portion 11*b* of the shoe. The bayonet opening 15 comprises an elongated opening 15*a* longitudinally of the heel and communicating with an interior enlarged opening 15*b* in such a manner that the stud 14 may be inserted first through the opening 15*a* into the opening 15*b* and then rotated to assume a crosswise position as illustrated in Fig. 2. The side walls of the interior opening 15*b* are covered with metal reinforcing strips 15*c* and 15*d*. A pair of staples 16 are engaged through the material of the heel portion 11*b* and limit turning of the head 14 to a position in which it is at right angles to the opening 15*a*.

The skate knife 12 is provided with a bracket 17 intermediate its ends, supporting a slide 18 in the form of a flat arcuate element. This slide 18 is adapted to engage a receiving opening or socket 19 formed in the sole portion 11*a* of the shoe. This receiving opening 19 is of dovetailed construction, that is, it has a restricted lower portion through which the bracket 17 may slide and an enlarged upper portion for receiving the edges of the slide 18. The opening 19 is reinforced with several metallic plates 20 and 21 arranged at the top and bottom thereof. The construction is such that the slide 18 works against the metallic parts 20 and 21 and not against the leather or other material from which the sole is constructed.

The skate knife 12 is provided with a conventional front post 22. This front post is equipped with a catch 23 adapted to hold the front of the skate upon the front of the sole portion. More particularly, the catch 23 comprises a catch bolt 23*a* pivotally mounted at the point 24 upon the front rod 22 and formed at the top with a hook portion 23*b* adapted to engage a receiving opening or socket 25 formed in the front portion of the sole. The lower end of the catch bolt 23*a* is formed with an undercut portion 23*e* adapted to engage the front end of a retaining leaf spring 23*c*. This retaining spring is fixed at one end upon the upper portion of the skate knife 12 and normally tends to assume a raised position so as to automatically engage the undercut portion 23*e* to hold the catch in the operative position.

Figure 1:
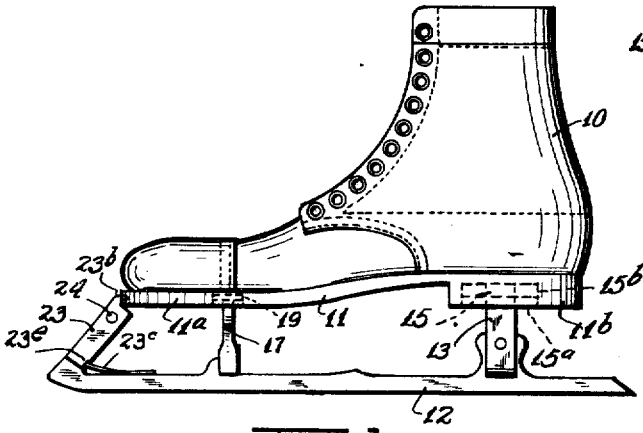
Fig. 1 is a side elevational view of an interchangeable skate and shoe constructed according to this invention.
Figure 4:
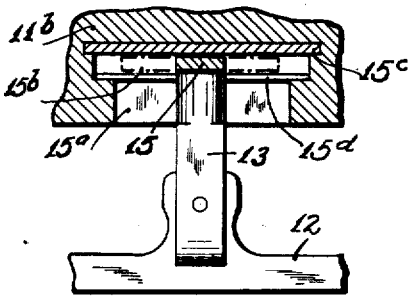
Fig. 4 is a fragmentary enlarged sectional view taken on the line 4—4 of Fig. 2.
Figure 5:
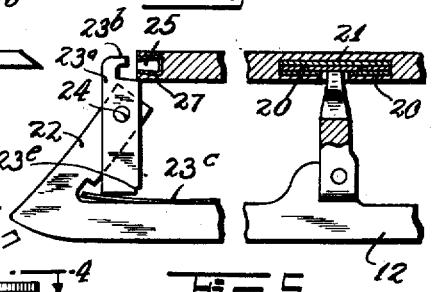
Fig. 5 is a fragmentary enlarged sectional view taken on line 5—5 of Fig. 2.

In Fig. 1, the catch 23 is shown in the operative position with the spring 23c holding it in this position. To move the catch into inoperative position, it is first necessary that the front end of the spring 23c be depressed and then the catch bolt may be pivoted to a position illustrated in Fig. 5 in which it is disengaged from the receiving opening 25. The receiving opening 25 is reinforced with a metallic insert 27. The catch bolt 23 is formed with a central slot 23d so as to be adapted to engage over the front rod 22 of the skate knife.

The operation of the device is as follows: To remove the skate from the shoe, the catch 23 should first be disengaged and then the skate rotated about the stud 13 so as to disengage the slide support 18 from the opening 19 and furthermore, so as to move the head 14 of the stud to a longitudinal position, in which position it may be removed from the opening 15a.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent, is:

1. An interchangeable skate and shoe, comprising a shoe having a shoe bottom, a skate having an offset head for rotative engagement with a socket in the shoe bottom, said skate also having a slide support for engaging a complementary opening extended in from an edge of said shoe bottom, and said skate also having a catch engageable with a portion of the shoe bottom to hold the skate fixed against rotative disengagement.

2. An interchangeable skate and shoe, comprising a shoe having a shoe bottom, a skate having an offset head for rotative engagement into a bayonet opening in the shoe bottom, said skate also having a slide support for engaging a complementary opening extended in from an edge of said shoe bottom, and said skate also having a catch engageable with a portion of the shoe bottom to hold the skate fixed against rotative disengagement, said shoe bottom comprising sole and heel portions, and said bayonet opening being formed in the heel portion, and said complementary opening for the slide support being formed in the sole portion, said catch being engageable with a receiving opening formed in the front of the sole portion.

3. An interchangeable skate and shoe, comprising a shoe having a shoe bottom, a skate having a stud with an offset head for rotative engagement into a bayonet opening in the shoe bottom, said skate also having a slide support for engaging a complementary opening extended in from an edge of said shoe bottom, said skate also having a catch engageable with a portion of the shoe bottom to hold the skate fixed against rotative disengagement, and said bayonet opening including means for limiting rotation of the offset head to a position transversely across a front opening on the bayonet slot.

4. An interchangeable skate and shoe, comprising a shoe having a shoe bottom, a skate having a stud with an offset head for rotative engagement into a bayonet opening in the shoe bottom, said skate also having a slide support for engaging a complementary opening extended in from an edge of said shoe bottom, said skate also having a catch engageable with a portion of the shoe bottom to hold the skate fixed against rotative disengagement, and said bayonet opening being provided with metallic inserts so that the offset head engages thereagainst.

5. An interchangeable skate and shoe, comprising a shoe having a shoe bottom, a skate having a stud with an offset head for rotative engagement into a bayonet opening in the shoe bottom, said skate also having a slide support for engaging a complementary opening extended in from an edge of said shoe bottom, said skate also having a catch engageable with a portion of the shoe bottom to hold the skate fixed against rotative disengagement, and said complementary opening for the slide support being provided with metallic plates on the sides thereof.

6. An interchangeable skate and shoe, comprising a shoe having a shoe bottom, a skate having a stud with an offset head for rotative engagement into a bayonet opening in the shoe bottom, said skate also having a slide support for engaging a complementary opening extended in from an edge of said shoe bottom, said skate also having a catch engageable with a portion of the shoe bottom to hold the skate fixed against rotative disengagement, and said catch comprising a catch bolt pivotally mounted intermediately on a portion of said skate and having a top end formed with a hook engageable in an upper opening on said shoe bottom.

7. An interchangeable skate and shoe, comprising a shoe having a shoe bottom, a skate having a stud with an offset head for rotative engagement into a bayonet opening in the shoe bottom, said skate also having a slide support for engaging a complementary opening extended in from an edge of said shoe bottom, said skate also having a catch engageable with a portion of the shoe bottom to hold the skate fixed against rotative disengagement, said catch comprising a catch bolt pivotally mounted intermediately on a portion of said skate and having a top end formed with a hook engageable in an upper opening on said shoe bottom, and a leaf spring mounted upon said skate and engageable with a portion of said catch bolt to hold the catch in its operative position.

8. In an interchangeable skate and shoe construction, a skate shoe having a shoe bottom consisting of sole and heel portions having flat tread surfaces facilitating normal use of the shoe, and means on the shoe bottom for coupling the skate therewith, and said means comprising sockets formed in the sole and heel portions of the shoe bottom and opening outwardly through the lower surfaces thereof, one of said sockets also opening through one side edge of the shoe bottom.

9. In an interchangeable skate and shoe construction, a skate shoe having a shoe bottom consisting of sole and heel portions having flat tread surfaces facilitating normal use of the shoe, and means on the shoe bottom for coupling the skate therewith, said means comprising sockets formed in the sole and heel portions of the shoe bottom and opening outwardly through the lower surfaces thereof, and the toe portion of the sole of said shoe bottom having a socket opening outwardly through the peripheral edge thereof.

10. In an interchangeable skate and shoe construction, a skate shoe having a shoe bottom consisting of sole and heel portions having flat tread surfaces facilitating normal use of the shoe, means on the shoe bottom for coupling the skate therewith, said means comprising sockets formed in the sole and heel portions of the shoe bottom and opening outwardly through the lower surfaces thereof, one of said sockets also opening through one side edge of the shoe bottom, and means for reinforcing the sockets in said sole and heel portions.

11. In an interchangeable skate and shoe construction, a skate shoe having a shoe bottom consisting of sole and heel portions having flat tread surfaces facilitating normal use of the shoe, means on the shoe bottom for coupling the skate therewith, said means comprising sockets formed in the sole and heel portions of the shoe bottom and opening outwardly through the lower surfaces thereof, one of said sockets also opening through one side edge of the shoe bottom, the toe portion of the sole of said shoe bottom having a socket opening outwardly through the peripheral edge thereof, and means comprising metallic inserts for reinforcing all of the sockets of the shoe bottom.

12. An interchangeable skate and shoe comprising a shoe having a shoe bottom including sole and heel portions, said sole and heel portions having flat lower surfaces provided with sockets, one of said sockets opening through the inner side edge of the shoe, and a skate having spaced coupling members adapted to engage the sole and heel portions of the shoe, and said members entering said sockets in coupling the skate with the shoe and in retaining the skate against movement longitudinally of the shoe bottom.

13. An interchangeable skate and shoe comprising a shoe having a shoe bottom including sole and heel portions, said sole and heel portions having flat lower surfaces provided with sockets, one of said sockets opening through the inner side edge of the shoe, a skate having spaced coupling members adapted to engage the sole and heel portions of the shoe, said members entering said sockets in coupling the skate with the shoe and in retaining the skate against movement longitudinally of the shoe bottom, and means on the skate, independent of said first named coupling members, engaging the shoe for retaining the skate against lateral movement with respect to the shoe.

14. An interchangeable skate and shoe comprising a shoe having a shoe bottom including sole and heel portions, said sole and heel portions having flat lower surfaces provided with sockets, one of said sockets opening through the inner side edge of the shoe, a skate having spaced coupling members adapted to engage the sole and heel portions of the shoe, said members entering said sockets in coupling the skate with the shoe and in retaining the skate against movement longitudinally of the shoe bottom, and means on the skate, independent of said first named coupling members, engaging the shoe for retaining the skate against lateral movement with respect to the shoe, said means comprising a member movably supported in connection with the front portion of the skate and engaging the front portion of the sole.

15. In an interchangeable skate and shoe construction, a skate for detachable mounting with a shoe bottom, said skate comprising a surface engaging portion, coupling elements projecting upwardly from said portion and spaced longitudinally thereof, said coupling elements projecting transversely to opposite sides of said portion, and one of said elements being arc-shaped in the direction of one end of the skate.

16. In an interchangeable skate and shoe construction, a skate for detachable mounting with a shoe bottom, said skate comprising a surface engaging portion, coupling elements projecting upwardly from said portion and spaced longitudinally thereof, said coupling elements projecting transversely to opposite sides of said portion, one of said elements being arc-shaped in the direction of one end of the skate, and one end portion of the skate being provided with a movable coupling element independent of said first named elements for retaining the skate against displacement from a shoe coupled therewith.

17. In an interchangeable skate and shoe construction, a skate for detachable mounting with a shoe bottom, said skate comprising a surface engaging portion, coupling elements projecting upwardly from said portion and spaced longitudinally thereof, said coupling elements projecting transversely to opposite sides of said portion, one of said elements being arc-shaped in the direction of one end of the skate, one end portion of the skate being provided with a movable coupling element independent of said first named elements for retaining the skate against displacement from a shoe coupled therewith, and tensional means cooperating with said movable coupling element to retain the same in operative position.

18. In an interchangeable skate and shoe, the combination with a shoe bottom having spaced coupling portions, one of which includes a channel opening outwardly through one side edge of the shoe bottom, of a skate having spaced coupling members, one of said coupling members rotatably engaging one coupling portion of the shoe bottom, and the other coupling member entering the channel of the other coupling portion through the edge of the shoe bottom and slidably engaging said channel in attaching the skate to the shoe bottom and in retaining the skate against movement longitudinally of the shoe bottom.

19. In an interchangeable skate and shoe, the combination with a shoe bottom having spaced coupling portions, one of which includes a channel opening outwardly through one side edge of the shoe bottom, of a skate having spaced coupling members, one of said coupling members rotatably engaging one coupling portion of the shoe bottom, the other coupling member entering the channel of the other coupling portion through the edge of the shoe bottom and slidably engaging said channel in attaching the skate to the shoe bottom and in retaining the skate against movement longitudinally of the shoe bottom, and means on the skate independent of said coupling members for engaging the shoe bottom to retain the skate against lateral movement with respect to the shoe bottom.

ANTON JOHNSON.